Figure 1:
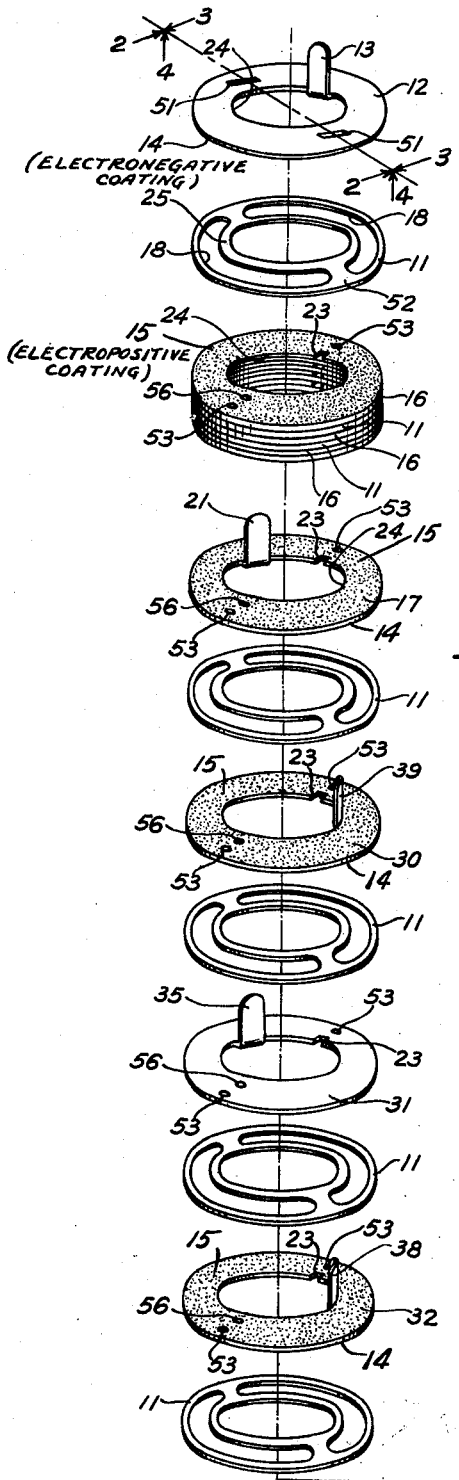
Figure 1:
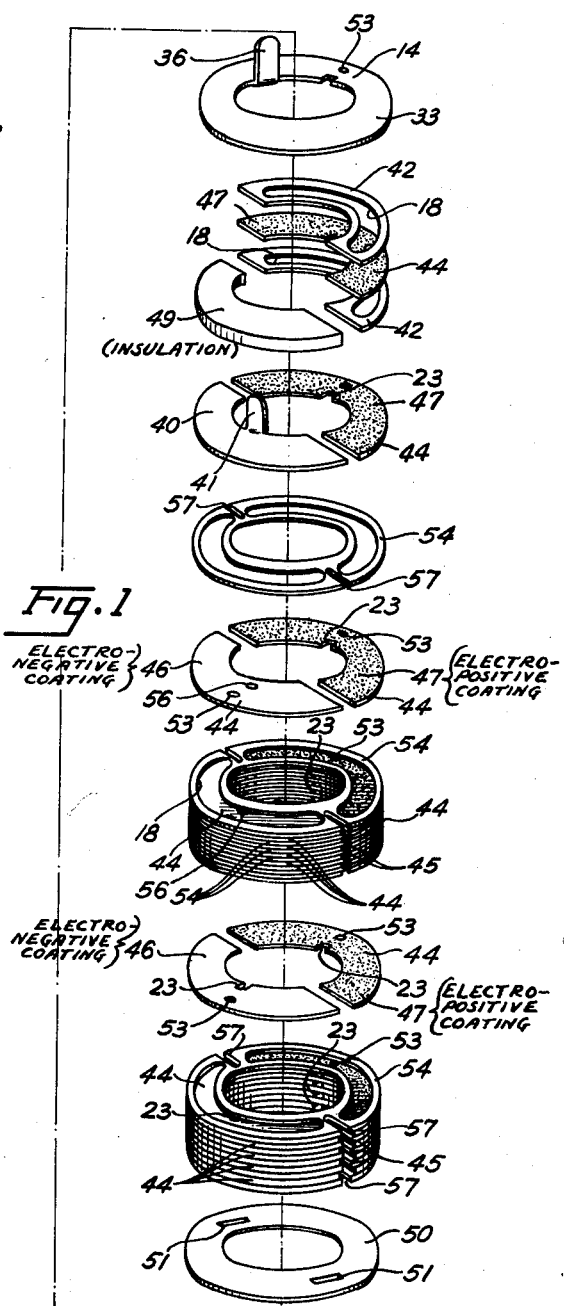

Feb. 23, 1965 D. L. BABCOCK 3,170,822
DEFERRED ACTION TYPE BATTERY CONSTRUCTION
Filed June 14, 1949 3 Sheets-Sheet 1

DAVID L. BABCOCK
INVENTOR

BY
ATTORNEYS

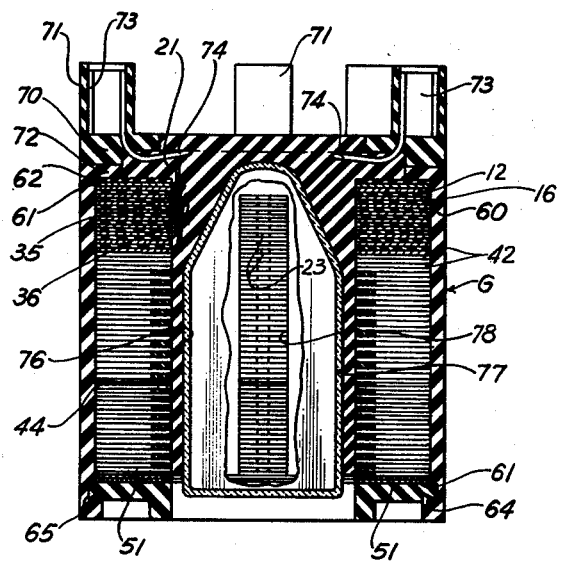
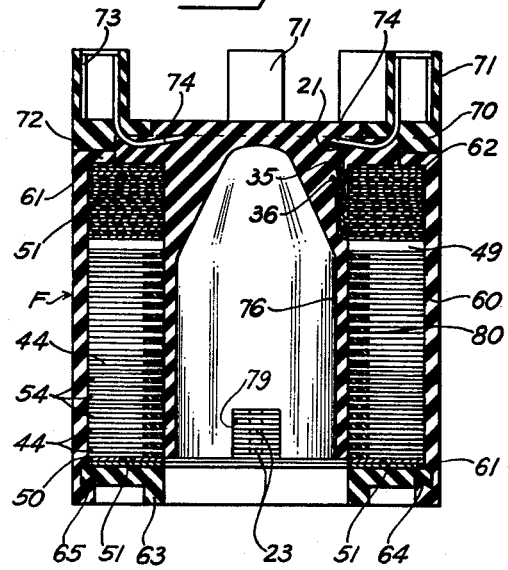

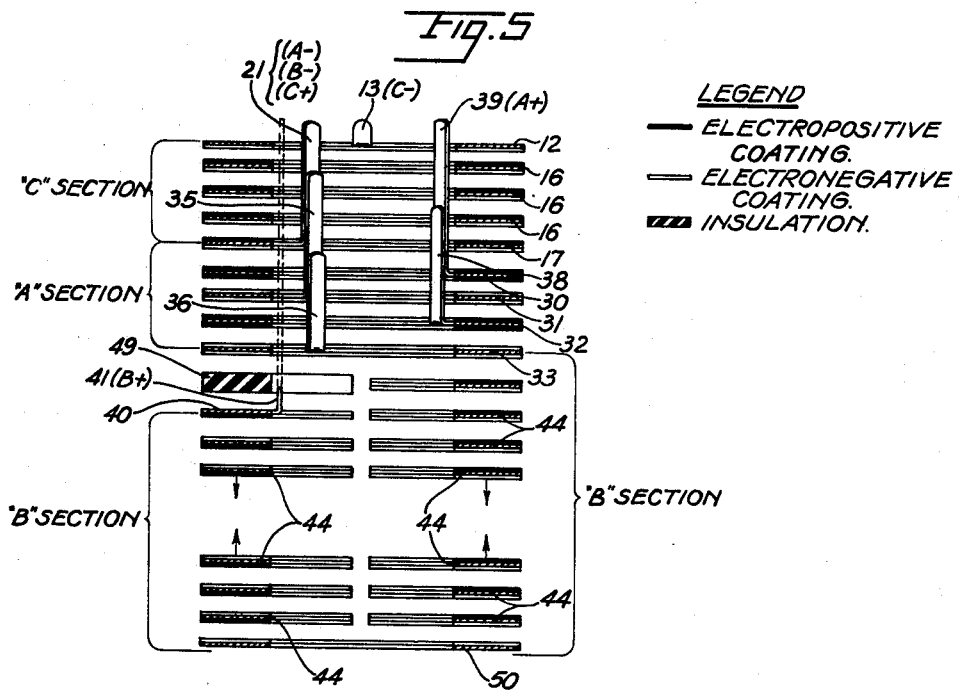
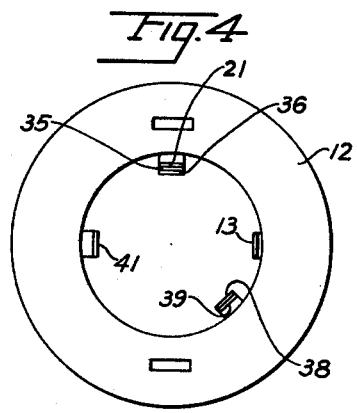

United States Patent Office
3,170,822
Patented Feb. 23, 1965

3,170,822
DEFERRED ACTION TYPE BATTERY
CONSTRUCTION
David L. Babcock, Rochester, N.Y., assignor, by mesne assignments, to the United States of America as represented by the Secretary of the Navy
Filed June 14, 1949, Ser. No. 98,924
4 Claims. (Cl. 136—90)

This invention relates to improvements in small high voltage batteries, particularly those of the deferred action type which contain a sealed electrolyte which is not applied to the electrodes until immediately before use.

Development of electric fuzes dependent upon electric and electronic devices for their operation has hitherto been impeded by the bulk and weight of the batteries which supply the required electric energy. Batteries used in proximity fuzes must be designed to be as small as possible and yet when put into service must be depended upon to supply the required current at rated voltage for a predetermined time regardless of climatic conditions.

In the usual deferred action type of battery, the electrolyte is maintained out of contact with the plates of the battery and the cells are unformed until the battery is called upon to supply power. Normally the electrolyte is contained in a glass vial or ampule which is mounted above a rupturing surface upon a compression spring or other means strong enough to hold the ampule away from the surface during normal handling or accidental dropping of the device, but weak enough to allow the force of inertia or setback, when a projectile containing the battery is fired in a gun for example, to force the vial into collision with the rupturing surface. The stress produced in the ampule by the impact shatters the glass, and electrolyte is then caused to flow into electrochemical contact with the electrodes by centrifugal force to form the cells of the battery.

Many electric fuzes depend upon vacuum and gaseous tubes for their operation. Consequently the battery units which provide the power for such electric fuzes usually include a low voltage (grid bias "C") section, a low voltage, high amperage (filament voltage "A") section, and a high (anode "B") voltage section. Each battery section is normally made up of a number of thin plates coated with electronegative and electropositive electrode material with annular separators positioned between the plates.

In deferred action type batteries constructed heretofore annular plates were utilized with two concentric nonconducting annular separators disposed between successive plates. The separators were blanked with a narrow width across the annulus to expose a large area of the coated surfaces to the electrochemical action of the electrolyte. When the ampule was smashed upon setback, the electrolyte was caused by centrifugal force to flow into the volume formed between the plates and the inner and outer separators. The voltage of each battery section could be increased by the addition of more cells, and the output potential of each section in which the cells were connected in series was thus dependent upon the height thereof.

The life of an individual cell is limited by the availability of ions entering into the electrochemical process or by saturation with the products of the process to an extent that the required potential difference can no longer be maintained by further reaction. These are forms of concentration polarization and result in stoppage or reversal of the current from the cell due to an increase in concentration of electrolyte around the anode and its decrease in the neighborhood of the cathode. One of the factors which determine the watt-second capacity of an individual cell of a deferred action type battery is the time required for the electrolyte to reach concentration polarization, which in turn is dependent upon the volume of electrolyte in electrochemical contact with the coatings on the plates.

It is an object of this invention to provide a small deferred action type battery unit consisting of a low voltage section, a low voltage, high amperage section, and a high voltage section which occupies considerably less volume but has substantially the same performance characteristics as the taller and bulkier battery units heretofore constructed.

Briefly this may be accomplished by providing coated plates of half-annulus shape for the anode voltage "B" section of the battery, arranging the successive half-annulus plates down one side and up the other side of one end of the cylindrical battery, and utilizing separators of greater thickness than have heretofore been used to provide a greater volume of electrolyte in electrochemical contact with the plates to increase the time required for the cells to reach concentration polarization and thus maintain the life of the cells by compensating for the decrease in cell area.

Other objects and advantages of the invention will be apparent from the following description taken in connection with the accompanying drawings which form a part hereof.

In the drawings:
FIG. 1 is a view in perspective of the battery plates and separators included in a cylindrical battery unit embodying the invention;
FIG. 2 is a vertical sectional view through a cylindrical battery unit comprising the plates and separators shown in FIG. 1 taken upon a plane which intersects the plates and separators along line 2—2; and
FIG. 3 is a vertical sectional view taken upon the same plane as FIG. 2 but looking in the opposite direction so that the half of the battery unit shown in FIG. 2 is cut away; and
FIG. 4 is a horizontal sectional view on line 4—4 of FIG. 1; and
FIG. 5 is a diagrammatic vertical sectional view showing by legend the electrode coatings on the battery plates and also illustrating how the connection lugs of the plates are commoned to form the terminals of the battery sections.

In a preferred embodiment of the invention shown in the drawings, the low voltage (grid bias) "C" section and the low voltage, high amperage (filament voltage) "A" section are made up of annular plates positioned near the top of the battery while the high (anode) voltage "B" section comprises substantially semicircular half-annulus plates arranged in potential series concentrically down one side and up the other side of the lower end of the cylindrical battery. The plates of the low voltage "C" section are coated on one side with an electronegative metal electrode material, e.g. zinc, and on the opposite side with an electropositive electrode material, e.g. carbon, or a single coating of electrode material is applied to a base plate of the opposite electrode material, e.g., a coating of carbon on a plate of zinc. The top five annular plates 12, 16, 16, 16, 17 shown in FIG. 1 with alternate annular nonconducting separators 11 make up the grid bias "C" section of the battery. The top plate 12 is provided with a connection lug 13 extending vertically upward which forms the negative terminal of the grid bias "C" section of the battery. The plate 12 is positioned with a coating of electronegative metal 14 on the bottom thereof facing a coating of electropositive material 15 on the upper surface of the second plate 16 to form the top cell of the "C" section. A coating of electronegative metal 14 on the bottom of the second plate 16 similarly faces a coating of electropositive material 15 on the upper surface of the third plate 16 to form the second cell of the "C" section, and successive plates 16, 17 have coatings of the electronegative metal and electropositive electrode material face-to-face. The metal of the second plate 16 acts as a means of connecting the top and the second cell. The four-cell grid bias "C" section thus includes the bottom coating 14 of the top plate 12, three annular plates 16, and the top surface of the fifth plate 17. The nonconducting separators 11 are of the same diameter as the annular plates and are blanked with a pair of kidney-shaped apertures 18 in the annulus thereof. The contour of each kidney-shaped aperture 18 includes two circular arcs of somewhat less than 180° angular displacement concentric with the circumference of the separators 11. The separators 11 are positioned between successive plates of the battery. The fifth plate 17 is provided with a connection lug 21 which forms the positive terminal of the grid bias "C" and the negative terminal of the "A" and "B" sections of the battery.

Rectangular filling slots 23 are provided along the periphery of the apertures 24 in the annular battery plates 16 and 17. In an assembled battery the bottom of a filling slot 23 is at a greater radial distance from the axis of the battery than the circular arc forming the inner surface of the contour of the kidney-shaped apertures 18 in the separators 11. The filling slots 23 thus overlap the kidney-shaped apertures 18 to form orifices through which the electrolyte is caused to flow into the volume formed in the kidney-shaped apertures 18 between successive plates when an ampule is smashed upon setback. Two small diameter leveling holes 53 are provided diametrically opposite each other in the plates 16 and 17, and two rectangular filling slots 51 of greater length than the web 52 between the kidney-shaped apertures 18 in the separators 11 are provided in the top plate 12 to permit flow of electrolyte from one side of the battery to the other.

The filament voltage "A" section includes four paralleled cells made up of the electronegative coating 14 on the bottom of the fifth plate 17, three successive annular plates 30, 31 and 32 and the upper electronegative coating 14 on the ninth plate 33 with separators 11 positioned between successive plates. As a filament voltage power supply must have low voltage and comparatively high current capacity, four cells are paralleled to form the "A" section of the battery. In the assembled battery connection lugs 21, 35 and 36 on plates 17, 31, and 33 respectively are connected together (as shown in FIGS. 2 and 3) to form the negative terminal of the "A" and "B" sections and the positive terminal of the grid bias "C" section of the battery. The sixth plate 30 and the eighth plate 32 are provided with electropositive coatings 15 on both sides thereof, and the connection lugs 39 and 38 on these plates 30 and 32, respectively, are connected together in the assembled battery to form the positive terminal of the filament voltage "A" section. The seventh annular plate 31 and the ninth plate 33 are provided with electronegative coatings 14 on both sides thereof. The plates 30, 31, 32 and 33 are formed with rectangular filling slots 23 along the periphery of the apertures 24 therein. Two small diameter leveling holes 53 are provided diametrically opposite each other in plates 30, 31, and 32, but only a single leveling hole 53 is provided in plate 33.

The anode voltage "B" section is made up of a number of successive half-annulus battery plates approximately semi-circular in outline arranged in potential series concentrically down one half and up the other half of the lower end of the cylindrical battery. The top half-annulus battery plate 40 in one half of the lower portion of the battery is formed with the positive terminal lug 41 of the anode voltage "B" section. This half-annulus plate 40 is provided with a coating of electropositive electrode material on the bottom thereof, and the remaining half-annulus plates 44 of the "B" section have electronegative coatings 46 and electropositive coatings 47 on opposite sides thereof. Since the ninth annular plate 33, disposed directly above the half-annulus plate 40, is formed with the negative terminal of the "B" section, the entire voltage of the "B" section will be applied across the insulator between said ninth plate 33 and said first half-annulus plate 40 when the cells are activated. An extra-thick half-annulus insulator 49 is provided to withstand this potential difference.

In FIGS. 2 and 3 two halves of a cylindrical battery unit embodying the invention are shown in vertical cross section with the views taken as if the battery were bisected vertically and the nearer half rotated through 180°. To simplify the specification and to aid in the understanding of the invention, the half of the battery shown in FIG. 3 in which the insulator 49 is assembled will be hereinafter referred to as the "F" half, while the opposite half shown in FIG. 2 will be designated the "G" half. In FIG. 2 a rupturable ampule 77 containing electrolyte is depicted assembled within the cylindrical compartment formed by the apertures in the plates, but the ampule is omitted in FIG. 3. Two half-annulus separators 42, each formed with a single kidney-shaped aperture 18, and a half-annulus battery plate 44 are assembled on the same level as the insulator 49 in the "G" half of the anode voltage "B" section. The remainder of the "B" section is constructed by arranging two half-annulus plates 44 concentrically on each level with annular separators 54 between successive levels. The annular separators 54 are similar to the separators 11 except that radial slots 57 are provided in the web 52 beginning at the outer circumference and extending almost to the inner periphery of the separators 54. Rectangular filling slots 23 are provided in all the half-annulus plates 44 in the "G" half of the battery and in the lower five half-annulus plates 44 in the "F" half of the battery, but none of the remaining half-annulus plates 44 in the "F" half of the battery are provided with filling slots 23. The bottom of a filling slot 23 is at a greater radial distance from the axis of the battery than a circular arc forming the inner surface of a kidney shaped aperture 18 in a separator 42 or 54. The filling slots 23 thus overlap the kidney-shaped apertures 18 to form orifices for the introduction of electrolyte into the volumes formed between the plates by the kidney-shaped apertures 18. A small diameter leveling hole 53 is provided in each half-annulus plate 44 above a kidney-shaped aperture 18. The leveling holes 53 act as orifices for the introduction of electrolyte into the volumes formed by the kidney-shaped apertures 18 between those plates of the "F" half of the battery which are not provided with filling slots 23 and also assure even distribution of electrolyte to all sections of the battery.

The half annulus plates 44 are formed to cover less than 180° of a circle so that a gap 45 occurs between the two half-annulus plates 44 on the same level. In the process of molding a jacket of plastic around the battery, softened plastic flows into the radial slots 57 and into the gaps 45 to form a continuous vertical barrier of insulation between half-annulus plates 44 in opposite halves of the battery. The half-annulus plates 44 in the "F" half of the "B" section are disposed with a coating of electro-negative metal 46 at the top thereof, while the half-annulus plates 44 in the "G" half of the "B" section are disposed with a coating of electropositive material 47 at the upper surface thereof. A small diameter air bleed hole 56 is provided in all of the annular plates (except in plates 12 and 50) and in all the half-annulus plates in the "F" half of the battery (except in the lower five plates 44 of the "B" section) to allow easy venting of trapped air and rapid attainment of equilibrium in the level of the electrolyte. An annular battery plate 50 assembled at the bottom of the "B" section is provided with rectangular leveling slots 51 of greater length than the web 52 between the kidney-shaped aperture 18 in the separators 54 to allow easy counterflow of air and electrolyte from one half of the battery to the other.

The separators 11, 42 and 54 are blanked of thicker material than separators heretofore used in the construction of such batteries. After the level of the electrolyte in the battery has reached equilibrium, the volume of electrolyte available to each single cell is that in the kidney-shaped apertures 18 between successive plates. The volume of electrolyte available to each single cell is thus directly dependent on the thickness of the separator between the coated plates, and as a greater volume of electrolyte will increase the time required for a single cell to reach concentration polarization, the increase in the thickness of the separators results directly in an increase in the watt-second capacity of the cell.

Approximately sixty annular separators were included in some types of deferred action battery units constructed heretofore. Normally such an increase in separator thickness would result in a taller and bulkier battery. However, in the preferred embodiment of the invention as described above, the size of the battery was diminished to approximately one half the height of batteries heretofore constructed without substantially changing the performance characteristics of the battery sections. Substantially the same voltages are furnished by the "A," "B" and "C" sections of the shorter battery of the preferred embodiment of the invention as were provided by the corresponding sections of the bulkier batteries heretofore constructed. A slight decrease in the watt-second capacity of the "B" section would be expected, but this is at least partly overcome by making the separators thicker and hence the life of the cells longer, without sacrificing too much of the gain in overall length.

Two halves of an assembled stack of battery plates and separators are shown in vertical section in FIGS. 2 and 3 after an outer jacket 60 of plastic has been molded around the stack. Steel washers 61 disposed adjacent the top and bottom of the stack lend rigidity to the assembled battery, and a top insert 62 of insulating material disposed above the top washer 61 insulates the connection lugs from the top washer 61. An insulating support sleeve 63 disposed adjacent the bottom washer 61 is formed with an outwardly extending flange having an undercut 64 in the lower edge thereof. During the jacketing operation softened plastic flows into the undercut 64, and upon solidification a lock-lip 65 is formed which provides a leak-proof seal between the support sleeve 63 and the plastic jacket 60 molded around the battery.

An annular turret 70 of insulating material molded with a plurality of upwardly extending hollowed cylindrical studs 71 around the outer circumference thereof is disposed above the upper end 72 of the plastic jacket 60. Cylindrical metal inserts 73 positioned within the hollowed studs 71 are formed with terminals 74 at the lower end thereof which protrude through the turret 70 and extend radially inward toward the axis of the battery. External connections can conveniently be made to the battery by metal plugs (not shown) which fit snugly within the metal inserts 73. The connection lugs 13, 21, 35, 36, 38, 39, 41 formed along the inner periphery of the battery plates are bent upward and soldered to the inwardly extending terminals 74.

To prevent leakage from the positive to the negative ends of the anode voltage "B" section across the half-annulus insulator 49, and thus minimize noise in the output of the "B" section, an inner jacket 80 of plastic material is molded around the inner periphery of the plates by injecting softened plastic under pressure into the cylindrical compartment formed by the apertures in the plates. A cylindrical metal insert (not shown) having the top end thereof rounded is inserted within the cylindrical compartment during the injection operation to shape a pocket 76 in the inner jacket 80 to receive a rupturable ampule 77 (shown in FIG. 2) filled with electrolyte. The metal insert is formed to cover all of the filling slots 23 in the battery plates during the molding operation with the result that two rectangular apertures 78 and 79 are formed in the solidified inner jacket 80 along the entire length of the stack in the "G" half of the battery and along the lower five half-annulus plates 44 in the "F" half of the battery respectively. The inner plastic jacket 80 thus covers the entire periphery of the stack at the height of the insulator 49 except for the rectangular aperture 78. During the injection operation the softened plastic flows around the connection lugs extending upwardly from the battery plates as well as around the inwardly extending terminals 74 in the space between the turret 70 and the top insert 62.

Upon setback the ampule 77 is forced to collide with a rupturing surface (not shown) and electrolyte is caused by centrifugal force to flow into electrochemical contact with the coatings on the battery plates through the rectangular apertures 78 and 79 and through the filling slots 23. The inner plastic jacket 80 is positioned so that the volume of electrolyte that flows to the "F" half of the anode voltage "B" section through the aperture 79 is approximately that required when final level has been achieved. The electrolyte levels by flowing from the "G" half of the battery over the top of the stack through the slots 51 in the plate 12 to the portions of the "C" and "A" sections in the "F" half of the battery. Similarly electrolyte flows through the slots 51 in the plate 50 into the "F" half of the battery.

While the embodiment of the present invention as herein described constitutes a preferred form, it is to be understood that other forms might be adopted, all within the scope of the claims which follow.

Having thus described my invention, what I claim is new and desire to secure by Letters Patent of the United States is:

1. A cylindrical battery of the deferred action type comprising a low voltage section at the top thereof made up of a number of thin annular coated battery plates having one side electronegative and the other side electropositive with successive plates having electronegative and electropositive sides face-to-face, a low voltage, high amperage section adjacent the low voltage section made up of a number of annular coated plates having both sides electropositive and an equal number of annular coated plates having both sides electronegative with successive plates having electronegative and electropositive sides face-to-face, and a high voltage section made up of a number of half-annulus coated plates with electronegative and electropositive sides arranged in potential series concentrically down one half and up the opposite half of the lower end of the battery with plates in successive layers having electronegative and electropositive sides face-to-face.

2. A cylindrical battery of the deferred action type comprising a low voltage section at the top thereof made up of a number of thin annular plates having one side electronegative and the other side electropositive with successive plates having electronegative and electropositive sides face-to-face, a low voltage, high amperage section adjacent the low voltage section made up of five annular plates having the lower surface of the upper plate, the upper surface of the lower plate, and both surfaces of the middle plate electronegative and having both surfaces of the second and fourth plates electropositive, a high voltage section made up of a number of half-annulus plates having opposite sides electronegative and electropositive arranged in potential series concentrically down one half and up the opposite half of the lower end of the battery with plates in successive layers having electronegative and electropositive sides face-to-face, a complete annular plate at the bottom of said high voltage section with an electronegative coating on the upper surface thereof, and annular separators between the plates of the low voltage and the low voltage, high amperage sections and between the layers of half-annulus plates in the high voltage section, said separators being formed with two kidney-shaped apertures in the annulus thereof with the contour of the apertures including two circular arcs of somewhat less than 180° concentric with said separators, the annular and the half-annulus plates of all three sections being formed with orifices for the introduction of electrolyte into the kidney-shaped apertures between the battery plates and into electrochemical contact with the sides of the plates.

3. A battery according to claim 2 in which the electronegative side of the bottom annular plate of the low voltage section is the lower side of this plate and is the cathode of the top cell of the low voltage, high amperage section.

4. A battery according to claim 2 in which the electronegative lower side of the bottom annular plate of the low voltage, high amperage section is the cathode of the top cell in one half of the high voltage section, further in which thin half-annulus separators formed with a single kidney-shaped aperture in the annulus thereof are disposed above and below the top half-annulus plate in this half of the high voltage section, and an extra-thick insulator is disposed in the opposite half of the high voltage section between the top half-annulus plate and said lower annular plate of the low voltage, high amperage section.

References Cited by the Examiner
UNITED STATES PATENTS

| | | |
|---|---|---|
| 1,224,376 | 5/17 | Hambuchen. |
| 1,887,811 | 11/32 | Ikin. |
| 2,981,778 | 4/61 | Freund _____ 136—90 |
| 2,981,779 | 4/61 | Freund _____ 136—90 |

OTHER REFERENCES

Product Eng., November 1945, page 783.

JOHN H. MACK, *Primary Examiner.*

F. P. McDERMOTT, JAMES L. BREWRINK, MURRAY TILLMAN, *Examiners.*